United States Patent Office 3,515,938
Patented June 2, 1970

3,515,938
CONTROL CIRCUIT FOR A MULTIPLE PULSE LASER MACHINING DEVICE
James H. Morse, Malibu, Calif., assignor to Hughes Aircraft Company, Culver City, Calif., a corporation of Delaware
Filed Apr. 5, 1968, Ser. No. 719,202
Int. Cl. H05b *37/00*
U.S. Cl. 315—240                  9 Claims

ABSTRACT OF THE DISCLOSURE

In the disclosed laser control circuit a plurality of electrical LC pulse-forming networks are respectively coupled via a like plurality of ignitron devices to a laser pumping flash lamp. Each pulse-forming network is driven from an adjustable power supply and includes manually operable switches to selectively adjust the time constant of the associated pulse-forming network to a desired value. Pulse generating and delay circuitry sequentially triggers the ignitrons into conduction while simultaneously triggering the flash lamp.

---

Figure 1:
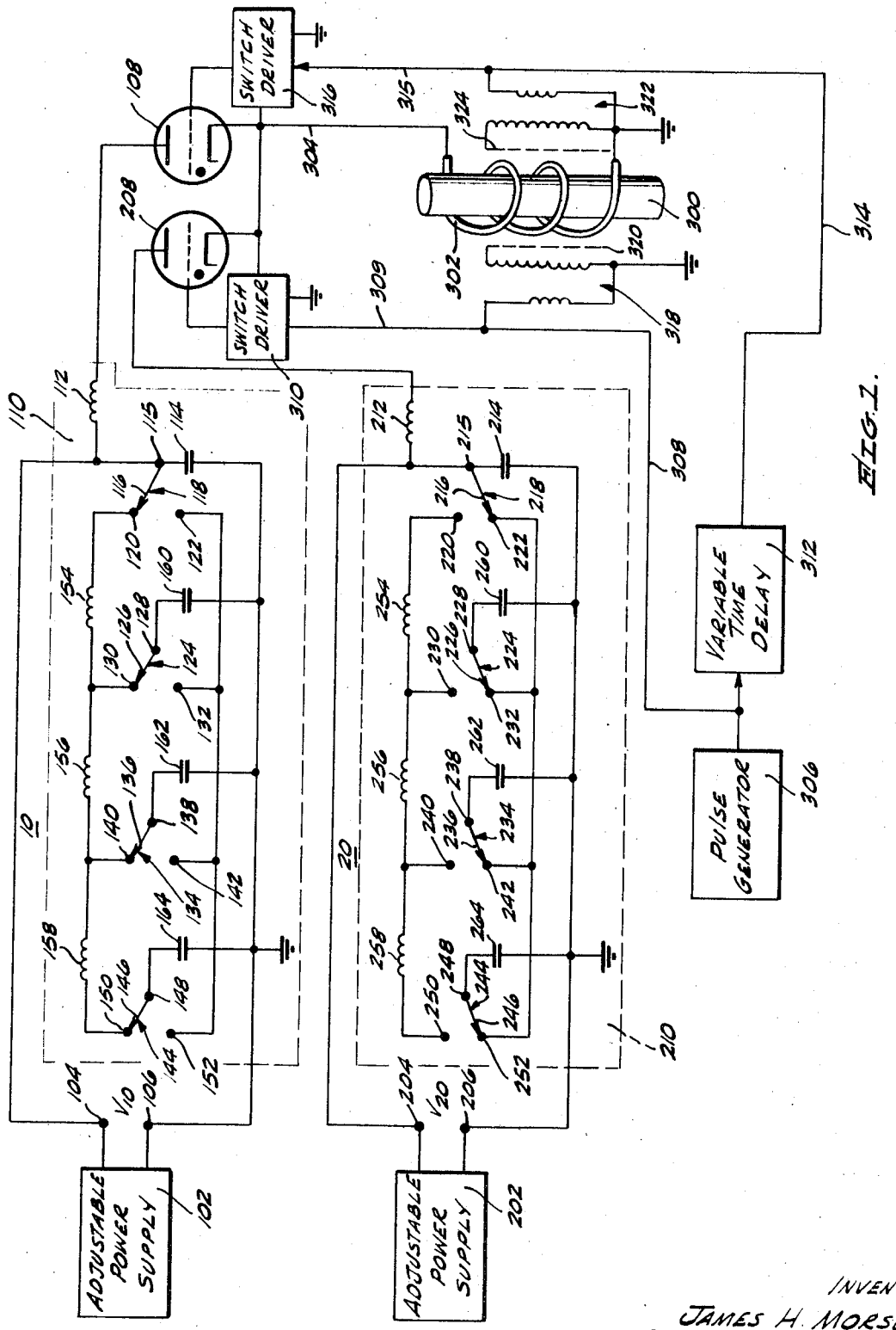

This invention relates to laser control, and more particularly relates to a circuit for controlling the generation of multiple laser pulses for use in laser welding, drilling or other machining operations.

Recently there has been increased interest and emphasis on a wide variety of applications for laser devices. One particular area of importance involves the use of laser energy to perform various types of machining operations, such as drilling, milling and welding. For laser welding it is desirable to employ a laser pulse of relatively low energy over a relatively long interval of time. Often, a welding pulse of sufficient length can be effectively simulated by employing separate shorter pulses which are spaced from one another in time. On the other hand, for drilling and milling operations, the laser pulse should be of relatively high energy and exist for a relatively short period of time. In order to minimize thermal shock for both welding and drilling-type operations, it is sometimes desirable to first preheat the work zone with a pulse of relatively low amplitude, after which a pulse of larger amplitude is applied to actually carry out the desired operation. On the other hand, prolonged cooling of a laser welding operation can be achieved by first applying a laser welding pulse and subsequently applying a laser pulse of reduced amplitude to the work being welded. Thus, a versatile laser machining device must be capable of providing multiple laser pulses of readily variable pulse amplitudes, durations and spacing.

Accordingly, it is an object of the present invention to provide a circuit for affording increased control over the generation of multiple laser pulses.

It is a further object of the present invention to provide a circuit for controlling the generation of laser pulses for use in a machining-type device to produce for each machining-type operation at least two laser pulses, each independently adjustable in both amplitude and duration.

It is a still further object of the present invention to provide a laser control circuit of the foregoing type which additionally affords ready control over the time interval between the two or more laser pulses.

In accordance with the foregoing objects, a laser control circuit according to the present invention includes a laser medium and means for exciting the medium to a condition of stimulated emission. A plurality of electrical pulse-forming networks, each including switching means for selectively adjusting the time constant of the associated pulse-forming network so as to provide an electrical pulse of preselected duration, are respectively connected to the laser medium exciting means via a like plurality of unidirectionally conductive electrically controlled switches. Means are provided for applying a predetermined voltage to each pulse-forming network, as well as for sequentially energizing the controlled switches to establish electrical conduction through the energized controlled switch while simultaneously energizing the laser medium exciting means.

Figure 2:
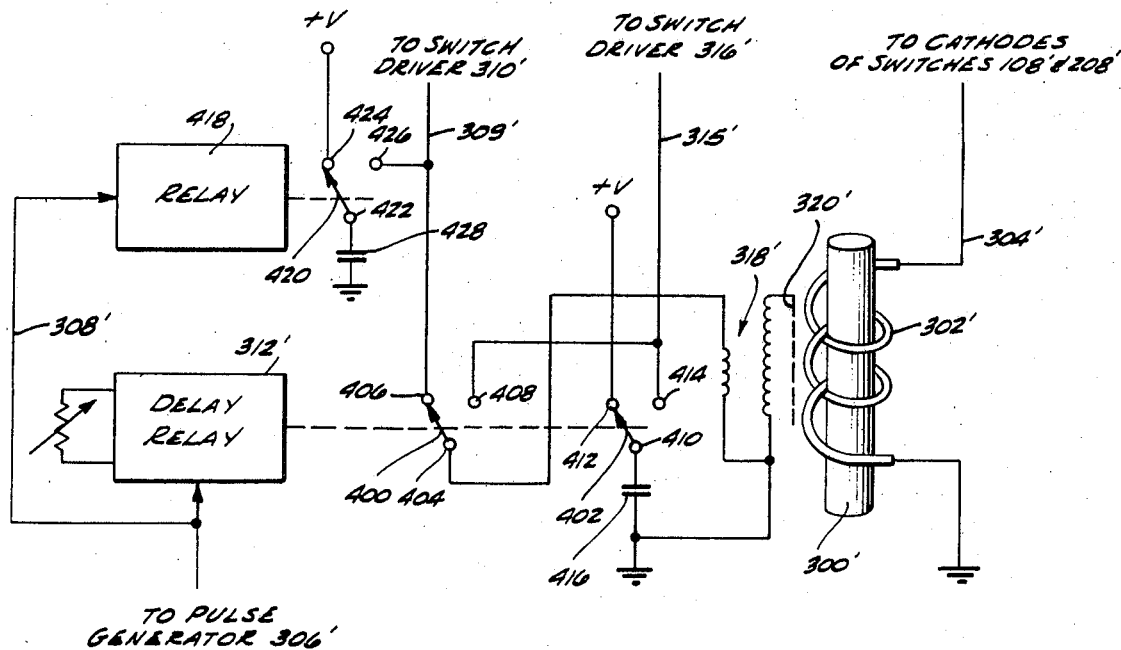

Additional objects, advantages and characteristic features of the invention will become readily apparent from the following detailed description of preferred embodiments of the invention when considered in conjunction with the accompanying drawings in which:

FIG. 1 is a schematic circuit diagram, partly in block and partly in pictorial form, illustrating a laser control circuit in accordance with an embodiment of the invention; and FIG. 2 is a similar schematic circuit diagram illustrating a portion of a laser control circuit in accordance with an alternate embodiment of the invention.

Referring to FIG. 1 with greater particularity, a laser control circuit is shown in which two laser pulses are provided for each operating sequence. Thus, the circuit includes two identical laser pulse control channels 10 and 20, although it should be understood that the circuit may include any practical plurality of such channels.

The first laser pulse control channel 10 includes an adjustable power supply 102 providing a DC voltage $V_{10}$ between its output terminals 104 and 106, the terminal 106 being connected to a level of reference potential designated as ground. The magnitude of the voltage $V_{10}$ determines the magnitude of the resultant laser pulse and in an illustrative example may be varied over a range of essentially 2 to 4 kv.

The voltage $V_{10}$ is applied to a unidirectionally conductive electrically controlled switch 108 via a variable time constant pulse-forming network 110. The controlled switch 108 may be a thyratron or an ignitron, and an example of a particular switch which may be employed is a GL7171 ignitron manufactured by General Electric Company. The pulse-forming network 110 consists of a plurality of LC (inductive-capacitive) branches which may be selectively switched into the network in order to vary the network time constant and thus control the duration of the resultant laser pulse.

Specifically, the pulse-forming network 110 includes a first inductor 112 connected between power supply terminal 104 and the anode of controlled switch 108, and a first capacitor 114 connected between the power supply terminals 104 and 106. The junction between inductor 112 and capacitor 114 is connected to fixed terminal 115 of a first, or mode selector, switch 118 having a movable contact arm 116 adapted to connect with either one of switch contact terminals 120 and 122 to selectively connect different portions of the remainder of the pulse-forming network 110 into the circuit. Similarly, a second switch 124 has a movable contact arm 126 adapted to connect fixed terminal 128 with either of switch terminals 130 and 132; a third switch 134 has a movable contact arm 136 adapted to connect fixed terminal 138 with either of switch terminals 140 and 142; and a fourth switch 144 has a movable contact arm 146 adapted to connect fixed terminal 148 with either of switch terminals 150 and 152. Moreover, a second inductor 154 is connected between switch terminals 120 and 130; a third inductor 156 is connected between switch terminals 130 and 140; and a fourth inductor 158 is connected between switch terminals 140 and 150. Also, second capacitor 160, third capacitor 162 and fourth capacitor 164 are connected between the ground level and respective switch terminals 128, 138 and 148. Preferably, each of the inductors 112, 154, 156 and 158 provides the same inductance value L while each of the capacitors 114, 160, 162 and 164 provides the same capacitance value C. It is pointed out that the pulse-forming network 110 is shown as comprising four LC branches and associated switches solely for illustrative purposes, and any practical number of such branches and switches may be employed as determined by individual circuit requirements.

When all of the switch arms 116, 126, 136 and 146 connect with the respective upper switch terminals 120, 130, 140 and 150, as shown, a maximum number of LC branches are incorporated into the pulse-forming network 110 so as to provide a maximum duration pulse which is especially suitable for laser welding operations. On the other hand, when the switch arms 116, 126, 136 and 146 connect with the respective lower switch terminals 122, 132, 142 and 152, maximum energy storage is afforded in the pulse-forming network. This enables laser pulses of maximum power to be achieved which are especially suitable for drilling and milling type operations. Switch settings at intermediate positions afford laser pulses of intermediate duration and power level as selected in accordance with a particular application.

The second laser pulse control channel 20 is identical to the first channel 10, and components of the channel 20 which correspond to respective components of the channel 10 are designated by the same second and third reference numeral digits as their counterpart components except that the components of channel 20 bear a first reference numeral digit of "2" rather than "1." Also, for illustrative purposes, the switch arms 216, 226, 236 and 246 of the second channel pulse-forming network 210 are shown set to a position affording maximum laser pulse power.

The laser device to be controlled by the circuit of the invention is illustrated in FIG. 1 as including a laser medium 300, such as a pink ruby rod, disposed within a helical xenon flash lamp 302 which is used to pump the laser material to a condition of stimulated emission. It should be understood, however, that other laser media and excitation arrangements are also suitable. The flash lamp 302 is connected between a current supply lead 304 and ground, the lead 304 being connected to the respective cathodes of the controlled switches 108 and 208.

In order to control initiation of conduction of the controlled switches 108 and 208, a pulse generator 306 is provided to generate the necessary triggering pulses. Output pulses from the generator 306, which may have an amplitude of around 200 volts for example, are applied via series leads 308 and 309 to a switch driver 310 connected between the grid and cathode of the electrically controlled switch 208. The switch driver 310 may include conventional thyratron or ignitron drive circuitry which provides the necessary voltage amplification (e.g. 200 volts to 2000 volts for the aforementioned GL 7171 ignitron) and/or isolation to drive the particular switch 208 employed. Pulses from the pulse generator 306 are also applied to a variable time delay device 312 which may be a time delay relay, for example. The time delay device 312 functions to delay pulses from the pulse generator 306 by a preselected amount of time which may vary essentially from zero to 1 second, for example. Delayed pulses from the time delay device 312 are applied via series leads 314 and 315 to a switch driver 316 connected between the grid and cathode of the electrically controlled switch 108, and which switch driver is similar to the switch driver 310 for the controlled switch 208.

Pulses on the lead 308 are also applied via a voltage step-up pulse transformer 318 to a triggering electrode 320 of the flash lamp 302. Similarly, pulses on the lead 314 are applied through a voltage step-up transformer 322 to triggering electrode 324 of the flash lamp 302. The transformers 318 and 322 should provide sufficient voltage amplification to achieve the desired voltage magnitude, such as around 15 kv., for example, on the flash lamp triggering electrodes 320 and 324.

In the operation of the circuit of FIG. 1, the capacitors connected into the pulse-forming networks 110 and 210 by selected ones of the switches 118, 124, 134, 144, 218, 224, 234 and 244 are initially charged from power supplies 102 and 202. When it is desired to commence operation of the laser 300, the pulse generator 306 provides an output pulse which is applied to both the control grid of the controlled switch 208 and to the triggering electrode 320 of the flash lamp 302. The switch 208 is triggered into heavy conduction, and a discharge path is established for the charged capacitors of the pulse-forming network 210 through the switch 208 and through the flash lamp 302. The lamp 302 then emits light energy sufficient to excite the laser medium 300 to a condition of stimulated emission, whereby the laser medium generates a pulse of coherent light. It should be noted that at this time the switch 108 remains nonconductive, and the selected capacitors in the pulse-forming network 110 remain charged. The duration of the laser pulse is determined by the length of time the flash lamp 302 remains on, which in turn is determined by the time required for the pulse-forming network to discharge. Thus, the laser pulse duration may be readily controlled by appropriate variation of the pulse-forming network time constant as determined by the setting of the pulse-forming network switches. When the capacitors in the pulse-forming network 210 have become essentially discharged, current flow through the switch 208 ceases, thereby turning the flash lamp 302 off and terminating pumping of the laser medium 300.

After the time interval required for the pulse from the generator 306 to pass through the variable time delay device 312, this pulse is applied to the control grid of the switch 108, as well as to the triggering electrode 324 of the lamp 302. The switch 108 is now triggered into conduction, and the lamp 302 is turned on again, as the selected capacitors in the pulse-forming network 110 discharge through the switch 108 and lamp 302. A second laser output pulse is generated, as the circuit operates in the same manner as set forth above with respect to the pulse-forming network 210 and the switch 208.

It may be seen that the two resultant laser pulses may each have variable amplitude and duration as determined by adjustment of the magnitude of the output voltages from the power supplies 102 and 202 and by the settings of the switches in the pulse-forming networks 110 and 210 to adjust the pulse-forming network time constants. Moreover, by varying the time delay provided by the delay network 312, the first and second generated laser pulses can be separated in time by varying amounts, or the second pulse could be made to commence essentially when the first pulse ends, or the second pulse could even be made to overlap the first pulse.

A modification of the circuit of FIG. 1 in which only a single flash lamp triggering pulse transformer is required is illustrated in FIG. 2. Components in the embodiment of FIG. 2 which are the same as corresponding components in the embodiment of FIG. 1 are designated by the same reference numerals as their counterpart components in the circuit of FIG. 1 except for the addition of a prime designation. However, in the embodiment of FIG. 2 the variable time delay device takes the form of a delay relay 312' which is adapted to control first and second relay contact arms 400 and 402, respectively. Relay contact arm 402 is connected to a fixed terminal 404 and is movable between contact terminals 406 and 408. Similarly, relay contact arm 402 is connected to a fixed terminal 410 and is movable between contact terminals 412 and 414. Contact terminal 406 is connected to lead 309' to switch driver 310' for controlled switch 208' (not shown); contact terminals 408 and 414 are connected together, as well as to lead 315' to switch driver 316' for controlled switch 108' (not shown); and contact terminal 412 is connected to a power supply terminal providing a voltage designated +V, which may be +200 volts, for example. A capacitor 416 is connected between terminal 410 and ground, while the primary winding of transformer 318' is connected between terminal 404 and ground.

Lead 308' from pulse generator 306' is connected to a second relay 418 which is adapted to control a relay contact arm 420 which is connected to a fixed terminal 422 and is movable between terminals 424 and 426. Terminal 424 is adapted to receive the aforementioned power supply voltage +V; terminal 426 is connected to the lead 309; and a capacitor 428 is connected between terminal 422 and ground.

In the operation of the circuit of FIG. 2, the relay contact arms 400, 402 and 420 initially assume the positions shown in FIG. 2, as the selected pulse-forming network capacitors are charged. Also, capacitors 416 and 428 are initially charged to the voltage +V. When an output pulse from pulse generator 306' occurs, relay 418 is energized to move contact arm 420 into contact with terminal 426. Capacitor 428 now commences to discharge and applies a voltage pulse of amplitude V via lead 309' to switch driver 310' for switch 208' and via relay contact arm 400 to the primary winding of transformer 318'. This results in the flashing of the lamp 302' and the generation of the first laser output pulse.

After passage of the selected delay time, delay relay 312' functions to move contact arm 400 into contact with terminal 408 and contact arm 402 into contact with terminal 414. Capacitor 416 now commences to discharge so as to apply a pulse of amplitude V via lead 315' to switch driver 316' for switch 108' and via relay contact arm 400 to the primary winding of transformer 318', thereby again flashing the lamp 302' and initiating the second laser output pulse.

Although the present invention has been shown and described with respect to particular embodiments, nevertheless various changes and modifications obvious to a person skilled in the art to which the invention pertains are deemed to lie within the spirit and scope and contemplation of the invention.

What is claimed is:

1. A laser control circuit comprising: a laser medium, means for exciting said medium to a condition of stimulated emission, a plurality of electrical pulse-forming networks each including switching means for selectively adjusting the time constant of the pulse-forming network so as to provide an electrical pulse of preselected duration, a like plurality of unidirectionally conductive electrically controlled switches connected between respective ones of said pulse-forming networks and said exciting means, means for applying a predetermined voltage to each of said pulse-forming networks, and means for sequentially energizing said controlled switches to establish electrical conduction therethrough while simultaneously energizing said exciting means.

2. A laser control circuit according to claim 1 wherein said means for applying a predetermined voltage includes means for independently adjusting to a selected magnitude the voltage applied to each said pulse-forming network.

3. A laser control circuit according to claim 1 where in the means for applying a predetermined voltage includes a power supply having first and second terminals; and the pulse-forming network includes a first inductor connected between said first terminal and an electrode of the associated electrically controlled switch, a first capacitor connected between said first and second terminals, and switching means for selectively connecting at least a second inductor and a second capacitor in series between said first and second terminals.

4. A laser control circuit according to claim 1 wherein the means for applying a predetermined voltage includes a power supply having first and second terminals; and the pulse-forming network includes an inductor connected between said first terminal and an electrode of the associated electrically controlled switch, a first capacitor connected between said first and second terminals, and switching means for selectively connecting at least a second capacitor in parallel with said first capacitor.

5. A laser control circuit according to claim 1 wherein each said electrically controlled switch is a thyratron.

6. A laser control circuit according to claim 1 wherein each said electrically controlled switch is an ignitron.

7. A laser control circuit comprising: a laser medium, flash lamp means for exciting said medium to a condition of stimulated emission, a first electrical pulse-forming network including a plurality of inductive and capacitive elements and mechanical switching means for selectively interconnecting said elements to provide a variable time constant of preselected duration for said first pulse-forming network, a second electrical pulse-forming network including a plurality of inductive and capacitive elements and mechanical switching means for selectively interconnecting said elements to provide a variable time constant of predetermined duration for said second pulse-forming network, a first unidirectionally conductive electrically controlled switch connected between said first pulse-forming network and said flash lamp means, a second unidirectionally conductive electrically controlled switch connected between said second pulse-forming network and said flash lamp means, first power supply means for applying a predetermined variable voltage to said first pulse-forming network, second power supply means for applying a preselected variable voltage to said second pulse-forming network, and means for sequentially energizing said controlled switches to establish electrical conduction therethrough while simultaneously triggering said flash lamp means.

8. A laser control circuit according to claim 7 wherein the last named means includes a pulse generator coupled to a control electrode of said first electrically controlled switch, variable time delay means coupled between said pulse generator and a control electrode of said second electrically controlled switch, first pulse transformer means coupled between said pulse generator and a trigger electrode of said flash lamp means, and second pulse transformer means coupled between said variable time delay means and a tirgger electrode of said flash lamp means.

9. A laser control circuit according to claim 7 wherein the last named means includes a pulse generator, relay actuated switch means coupled to said pulse generator and responsive to a pulse from said pulse generator for applying a control voltage to a control electrode of said first electrically controlled switch, a pulse transformer having a primary winding and having a secondary winding coupled to a trigger electrode of said flash lamp means, and delay relay actuated switch means for initially applying said control voltage from said relay actuated switch means to said primary winding and in response to a delayed pulse from said pulse generator for applying a control voltage to a control electrode of said second electrically controlled switch and to said primary winding.

(References on following page)

References Cited

UNITED STATES PATENTS

| | | | |
|---|---|---|---|
| 2,235,385 | 3/1941 | Rava | 315—241 X |
| 2,877,383 | 3/1959 | Lasher | 315—241 X |
| 3,369,101 | 2/1968 | Di Curcio | 331—94.5 X |
| 3,387,177 | 6/1968 | Israel et al. | 315—242 X |
| 3,427,501 | 2/1969 | Laub et al. | 315—200 |
| 3,430,159 | 2/1969 | Roeber | 331—94.5 |

JAMES D. KALLAM, Primary Examiner

R. F. POLISSACK, Assistant Examiner

U.S. Cl. X.R.

315—160, 165, 166, 173, 175, 176, 241, 242, 243, 244, 323; 331—94.5; 219—121